United States Patent [19]

McDonald

[11] 4,288,390

[45] * Sep. 8, 1981

[54] PREPARATION OF N-(AMINOMETHYL)-α,β-ETHYLENICALLY UNSATURATED CARBOXAMIDES AND THEIR POLYMERS

[75] Inventor: Charles J. McDonald, Midland, Mich.

[73] Assignee: The Dow Chemical Co., Midland, Mich.

[ * ] Notice: The portion of the term of this patent subsequent to Sep. 4, 1996, has been disclaimed.

[21] Appl. No.: 44,436

[22] Filed: Jun. 1, 1979

Related U.S. Application Data

[63] Continuation-in-part of Ser. No. 856,704, Dec. 2, 1977, Pat. No. 4,166,828.

[51] Int. Cl.$^3$ .................................................. C07C 102/00
[52] U.S. Cl. .................................. 564/204; 526/312; 544/379; 564/123; 564/208
[58] Field of Search ..................... 260/561 N, 562 R; 544/379; 526/312

[56] References Cited

U.S. PATENT DOCUMENTS

| | | | |
|---|---|---|---|
| 2,328,901 | 7/1943 | Grimm et al. | 260/561 N |
| 3,079,434 | 2/1963 | Christenson et al. | 260/561 N |
| 3,171,805 | 3/1965 | Suen et al. | 260/561 N |
| 3,178,385 | 4/1965 | Dinges | 260/561 N |
| 3,349,121 | 10/1967 | Müller | 260/561 N |
| 4,166,828 | 9/1979 | McDonald | 260/562 R |

FOREIGN PATENT DOCUMENTS

| | | | |
|---|---|---|---|
| 1102157 | 3/1961 | Fed. Rep. of Germany | 260/561 N |
| 1251025 | 12/1960 | France | 260/561 N |

OTHER PUBLICATIONS

Adams et al., Organic Reactions, vol. I, 1947, John Wiley & Sons, N.Y., N.Y., pp. 310, 327–329.
Thompson, J., Pharm. Sciences, 57(5) 1968, pp. 715–733.
The Merck Index, 7th Ed., p. 460.
Encyclodepia of Polymer Science & Technology, vol. 1, pp. 179, 195.
Müller, Makromol Chem., 57 (1962), pp. 27–51.

*Primary Examiner*—Arthur P. Demers
*Attorney, Agent, or Firm*—Jeffrey S. Boone

[57] ABSTRACT

N-(aminomethyl)-α,β-ethylenically unsaturated carboxamides such as N-(dimethylaminomethyl)acrylamide are readily prepared without coincident production of saturated impurities by reacting at a pH below 7 an α,β-ethylenically unsaturated carboxamide such as acrylamide or N-substituted derivative such as N-methylolacrylamide with a secondary amine such as dimethylamine, and a lower aldehyde such as formaldehyde when such is required. The resulting aminomethyl carboxamides are polymerized at a pH of 7 or less to form polymers containing essentially no gelled product.

11 Claims, No Drawings

PREPARATION OF N-(AMINOMETHYL)-α,β-ETHYLENICALLY UNSATURATED CARBOXAMIDES AND THEIR POLYMERS

CROSS-REFERENCE TO RELATED APPLICATION

This application is a continuation-in-part of my copending application Ser. No. 856,704, filed Dec. 2, 1977, now U.S. Pat. No. 4,166,828.

BACKGROUND OF THE INVENTION

This invention relates to a process for preparing cationic carboxamide monomers and their polymers.

Cationic polyacrylamides are known to be excellent flocculants for the treatment of sewage and aqueous suspensions of other organic and inorganic particulates. Probably the best known cationic polyacrylamides are those prepared by reacting polyacrylamide with formaldehyde in a dialkylamine. See, for example, U.S. Pat. Nos. 2,328,901; 3,539,535 and 3,979,348 as well as Suen and Schiller in *Industrial Engineering Chemistry*, Vol. 49, pages 21-32 (1956). Unfortunately, the cationic polyacrylamides prepared by these processes exhibit undesirable amine odors and are less stable than desired for many applications.

Attempts have been made to prepare such cationic polyacrylamides from corresponding cationic monomers. See, for example, U.S. Pat. No. 3,256,140. The results of such attempts have not been entirely satisfactory due to the substantial amount of saturated impurities resulting from the addition of the amine reactant across the ethylenic group of the acrylamide. Accordingly, as proposed in U.S. Pat. Nos. 3,349,121 and 3,178,385, it has been necessary to employ rather exotic and expensive amines to minimize the formation of such saturated impurities. Often, the polymers containing the residues of such exotic amines do not exhibit the excellent flocculation characteristics of polymers prepared from the simpler dialkylamines. Moreover, it has often been observed that the cationic polyacrylamides prepared by polymerizing cationic acrylamides often contain substantial amounts of undesirable gelled or cross-linked materials.

In view of the aforementioned deficiencies of the prior art methods, it would be highly desirable to provide an economical process for preparing cationic carboxamides and polymers thereof which are odorless and essentially free of gelled products and other saturated impurities.

SUMMARY OF THE INVENTION

In one aspect, the present invention is a process for preparing N-(aminomethyl)-α,β-ethylenically unsaturated carboxamides, which process comprises contacting an α,β-ethylenically unsaturated carboxamide with a lower aldehyde and a suitable amine at a pH of less than about 7 and under other conditions sufficient to cause reaction of the carboxamide, aldehyde and amine to form at least 10 mole percent (based on moles of carboxamide) of the desired N-(aminomethyl)-α,β-ethylenically unsaturated carboxamide, hereinafter called cationic carboxamide. Alternatively, the carboxamide is first reacted with aldehyde to form an N-alkylolcarboxamide which is then contacted with the amine at a pH of less than 7 and other conditions such that the N-methylolcarboxamide is converted to the desired cationic carboxamide. As another alternative, the N-alkylolcarboxamide can be first reacted with alkanol to form an N-alkoxyalkylcarboxamide and then reacted with amine at a pH of less than 7 to form the desired cationic carboxamide.

Surprisingly, by conducting the aforementioned reaction wherein (1) the carboxamide is contacted with aldehyde and amine or (2) the N-alkylolcarboxamide or N-alkoxyalkylcarboxamide is contacted with amine at a pH of less than about 7, the saturated impurity which would normally be expected to be formed by the addition reaction of the amine to the ethylenic group of the carboxamide is minimized. Moreover, if desired, the resulting cationic carboxamide can be easily quaternized by contacting the cationic carboxamide with a quaternizing agent such as methyl chloride or dimethyl sulfate. By subsequently polymerizing the quaternized monomer, the problems normally experienced in carrying out the quaternization of polymers of the cationic carboxamides, which is a sensitive process, are averted.

In a further aspect, this invention is a process for preparing a cationic carboxamide polymer, which process comprises subjecting the cationic carboxamide to conditions of free radical initiated addition polymerization at a pH less than about 7. Surprisingly, by carrying out the polymerization of the cationic carboxamide at a pH less than about 7, a high molecular weight polymer which is essentially free of gelled or cross-linked polymer is obtained. Such high molecular weight polymers generally have weight average molecular weights ($M_w$) greater than 10,000, preferably greater than a million. These polymers have properties similar to those obtained under basic conditions, i.e., pH > 9, and are essentially free of undesirable amine odor and exhibit reduced flammability.

As would be expected, the cationic carboxamide polymers of the present invention are usefully employed in the flocculation of dispersed particulate solids from aqueous suspension, for example, sewage, effluents from paper manufacturing operations and industrial mining operations. Moreover, these cationic polymers exhibit excellent activity as paper drainage and dry strength additives.

DETAILED DESCRIPTION OF THE INVENTION

Carboxamides suitably employed in the practice of this invention are those unsaturated compounds which contain one or more C=C (ethylenic groups) which are conjugated or isolated in relation to one or more carboxamide

radicals. Such carboxamides are advantageously dispersible in the reaction medium under conditions used in preparing the cationic carboxamides. Preferably, the carboxamides are soluble in water under reaction conditions to be employed in preparing the cationic carboxamide, i.e., they will form at least a 5 weight percent aqueous solution. Of particular interest in the present invention are the α,β-ethylenically unsaturated aliphatic monocarboxamides, especially those represented by the structural formula:

wherein $R^1$ is hydrogen, alkyl or cycloalkyl and $R^2$ is hydrogen, alkyl, hydroxyalkyl or similar substituent that is inert in the reaction to form the cationic carboxamide. Preferably, $R^1$ is hydrogen, methyl or ethyl and $R^2$ is hydrogen, methyl, ethyl or hydroxyethyl, most preferably hydrogen. Exemplary preferred carboxamides include acrylamide, methacrylamide, ethacrylamide, N-methylmethacrylamide, N-methylacrylamide, N-ethylacrylamide, and the like, with acrylamide being most preferred. As mentioned hereinbefore, alternative to the aforementioned carboxamides in the practice of this invention are the N-alkylolcarboxamides such as N-methylolacrylamide, N-methylolmethacrylamide, N-(hydroxyethyl)acrylamide and the like, with N-methylolacrylamide being preferred; and N-alkoxyalkylcarboxamides such as N-methoxymethylacrylamide, N-methoxymethylmethacrylamide and N-ethoxymethylacrylamide, with N-methoxymethylacrylamide being preferred. Such N-alkylolcarboxamides and N-alkoxyalkylcarboxamides are represented by the structural formula:

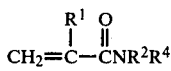

wherein $R^1$ and $R^2$ are as hereinbefore defined and $R^4$ is alkylol or alkoxyalkyl, preferably methylol and methoxymethyl. Hereinafter for the purpose of brevity, the term "unsaturated carboxamide" shall include unsaturated N-alkylolcarboxamides and unsaturated N-alkoxyalkylcarboxamides as well as the unsaturated carboxamides.

Amines employed in the practice of this invention are advantageously secondary amines which are dispersible in the reaction medium under conditions used to prepare the cationic carboxamide. Preferably they are soluble in water, i.e., they will form at least a 5 weight percent aqueous solution. Of particular interest are secondary amines represented by the structural formula:

$$HN(R^3)_2 \qquad II$$

wherein each $R^3$ is individually hydrocarbyl such as alkyl, cycloalkyl, alkenyl, aryl or arylalkyl or inertly substituted hydrocarbyl such as hydroxyalkyl, aminoalkyl, sulfoalkyl wherein sulfo is in acid or salt form, carboxyalkyl wherein carboxy is in acid or salt form or cyanoalkyl. Alternatively, the $R^3$ groups are collectively alkylene, alkenylene or other divalent hydrocarbon radicals or inertly substituted diradicals which when taken with the amino nitrogen forms a heterocyclic ring, preferably having 5 or 6 members. The diradical, while predominantly hydrocarbon, may be alkylaminoalkyl, alkoxyalkyl, alkylthioalkyl and the like. By "inertly substituted" is meant that the substituent is inert in the reaction forming the cationic carboxamide. "Hydrocarbyl" as used herein is a monovalent hydrocarbon radical. Preferably, $R^3$ is alkyl, especially lower alkyl having from 1 to 8 carbon atoms; hydroxyalkyl, especially those having from 2 to 4 carbon atoms; or alkenyl having from 3 to 8 carbon atoms. Exemplary amines include dimethylamine, methylethylamine, hydroxyethylmethylamine, dibutylamine, piperidine, morpholine, pyrrolidine, diethanolamine, diallylamine, N-methylaminoethane sulfonic acid, 2-aminopropionitrile and 2-[($\beta$-methylamino)ethyl]pyridine. Of the foregoing amines, the dialkylamines such as diethylamine and dimethylamine are especially preferred.

For the purposes of this invention, it is understood that the term "lower aldehyde" means aldehydes having 1 to 3 carbons and materials which will generate such lower aldehydes under the conditions of the process of this invention. Examples of aldehydes include formaldehyde, acetaldehyde and propionaldehyde with formaldehyde being preferred. Examples of materials containing or having the capability of generating aldehydes, particularly formaldehyde, include paraformaldehyde, formalin, trioxymethane (often called trioxane), formals (e.g., $CH_3OCH_2OCH_3$) and hemiformals (e.g., $HOCH_2OCH_3$).

The reaction of the unsaturated carboxamide with the amine and aldehyde (when aldehyde is required) is advantageously carried out in aqueous solution, preferably in a solution containing from about 8 to about 75 weight percent of the unsaturated carboxamide; from about 4 to about 50 weight percent of aldehyde (when aldehyde is required); and from about 5 to about 20 weight percent of the suitable amine. The recited concentration range of amine is given as weight percent of free amine, even though the amine is generally in salt form under reaction conditions.

Although not critical, it is often desirable, when reacting unsaturated carboxamides

with aldehyde and amine, to prereact the secondary amine with aldehyde to form an adduct which is subsequently reacted with the unsaturated carboxamide in an aqueous medium. In such instances, the adduct is normally prepared by reacting an aqueous solution of aldehyde with the suitable amine. While the reaction may take place at ambient or elevated temperatures, the reaction proceeds at a sufficiently rapid rate in most instances at ambient temperature. The molar ratio of the aldehyde to the suitable amine may vary over a wide range but the preferred ratio is usually within the range from about 10 to 1 to about 1 to 10, most preferably, a ratio of aldehyde to amine from 2 to 1 to 1 to 2. While it is generally desirable to prepare this adduct in as concentrated form as possible in order to minimize dilution effects, the concentration of the adduct in the aqueous medium should be from about 30 to about 60 weight percent, most preferably from about 38 to about 53 weight percent. The amine contribution is calculated as if it were free amine even though it may be in salt form.

When a N-methylolcarboxamide is to be employed, an unsaturated carboxamide

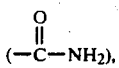

preferably in the form of an aqueous solution, is contacted with an aldehyde, preferably in the form of an aqueous solution and most preferably formaldehyde, at a pH in the range from about 9 to about 12 under conditions conventionally employed to produce N-methylolcarboxamides. When a N-alkoxyalkylcarboxamide is to be employed, the N-alkylolcarboxamide is reacted with an alkanol such as methanol or ethanol under acidic conditions which are commonly employed to prepare N-alkoxymethylcarboxamides.

In reacting the unsaturated carboxamide with (1) aldehyde and amine, (2) aldehyde/amine adduct or (3) amine as the case may be, the aqueous reaction mixture is maintained at a pH less than about 7, preferably from about 0.02 to about 4 and most preferably from about 1 to about 2. The temperature of the reaction is not particularly critical and is suitably any temperature which provides the desired reaction. Generally, however, the reaction temperature ranges from about 20° to about 90° C., preferably from about 30° to about 60° C. While the reaction time required to achieve the desired conversion to cationic carboxamide will decrease as temperature increases, effective reaction normally occurs within 60 to about 240 minutes at intermediate reaction temperatures from about 40° to about 65° C. In any event, the reaction is continued for a period of time sufficient to convert the carboxamide moiety to the desired cationic form.

As mentioned hereinbefore, the pH of the reaction mixture is critical. Therefore, it is desirable that the reactants as they are supplied to the reaction mixture be maintained at pH's below the aforementioned critical limit. Accordingly, it is a common practice to acidify the reaction mixture and/or reactants being supplied to the reaction mixture with hydrogen chloride or some other strong acid. Following formation of the desired cationic carboxamide, the product of the reaction may be isolated if desired or used in its crude form. In either case, it is advantageous to maintain the reaction product at pH of less than 7, preferably less than 4, at least until all of unreacted amine has been removed from the reaction product. In the case when acrylamide, N-alkylolacrylamide or N-alkoxyalkylacrylamide is the unsaturated carboxamide, it is desirable to maintain the reaction mixture at a pH below 5, preferably less than 3, most preferably from 1 to 2.5. Moreover, it is generally found that the cationic carboxamide is more stable at such lower pH's, even when no unreacted amine is present.

While the reaction is suitably carried out in a reaction medium that is essentially aqueous, the reaction is also usefully practiced in a medium that is essentially a water-in-oil emulsion. In such practice, aqueous solutions of one or more of the reactants are dispersed in an oil phase usually with the aid of a water-in-oil emulsifier. The proportions of ingredients (i.e., oil phase, aqueous phase, emulsifier, etc.) in such practices are similar to those conventionally employed in water-in-oil polymerization of water-soluble monomers, e.g., as in U.S. Pat. No. 3,284,393 and water-in-oil Mannich reactions, e.g., U.S. Pat. No. 3,979,349.

In carrying out the reaction to form the cationic carboxamide, it is often desirable to include a small amount of a polymerization inhibitor, such as hydroquinone, t-butylpyrocatechol, phenothiazine or copper sulfate, in conventional quantities from about 0.001 to about 0.1 weight percent based on the carboxamide reactant.

The cationic carboxamide reaction product obtained in the practice of this invention has the general appearance of an oil which is soluble in water to a certain degree. The resulting preferred cationic carboxamides are represented by the formula:

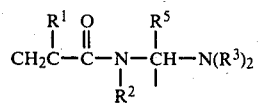

wherein $R^1$, $R^2$ and $R^3$ are as defined hereinbefore and $R^5$ is hydrogen or alkyl having 1 or 2 carbons. Especially preferred cationic carboxamides are N-(dimethylaminomethyl)acrylamide, N-(diethylaminomethyl)acrylamide and N-(diallylaminomethyl)acrylamide. These cationic carboxamides polymerize readily under conditions of addition polymerization normally employed in polymerizing water-soluble monomers.

In the polymerization of the resulting cationic carboxamide, the cationic carboxamide is subjected to polymerization conditions which are generally conventional for the free radical initiated, addition polymerization of carboxamide and N-substituted carboxamide monomerrs except that the polymerization is carried out at a pH below 7, preferably from about 2 to about 4. For example, the cationic carboxamide, advantageously dissolved or dispersed in an aqueous medium containing a free radical generating initiator such as a peroxide or an azo-type initiator is subjected to polymerization conditions such as temperatures from about 20° to about 60° C., preferably from about 25° to about 40° C. This polymerization is advantageously carried out at approximately atmospheric pressure wherein the gas over the reaction mixture is essentially free of oxygen and is preferably a gas inert to the polymerization such as nitrogen. The molecular weight of the polymer may be regulated by conventional chain transfer agents. As with the reaction to form the cationic carboxamide, the polymerization of the cationic carboxamide may also be carried out in a water-in-oil emulsion, e.g., by the process described in U.S. Pat. No. 3,284,393.

The resulting polymer is then recovered by conventional procedures and may be employed itself as a flocculating agent or may be quaternized to form a polymer having further enhanced flocculating characteristics. Such quaternization reactions are well known and may be conducted by contacting the resulting polymer with a quaternizing agent such as an alkyl or aryl halide, or a dialkyl sulfate such as dimethyl sulfate. Preferably in such quaternizing agents, alkyl has one or two carbons and alkylene has two or three carbons. Examples of preferred quaternizing agents include methyl chloride, dimethyl sulfate and methyl bromide. Suitable conditions for quaternization of the polymer are described in British Pat. No. 887,900.

In some instances, it may be desirable to quaternize the unsaturated cationic carboxamide prior to polymerization. In such instances, the quaternization reaction is carried out under conventional conditions mentioned above except that the pH of the reaction mixture during quaternization is carefully maintained below a pH of 7. Preferably the pH is from about 3 to about 5 when the quaternizing agent is dimethyl sulfate, and the pH is preferably from about 5 to about 7 when the quaternizing agent is methyl chloride or other suitable alkyl halide. Following quaternization of the monomer, it may be recovered in essentially pure form prior to polymerization or the resulting quaternization mixture may be subject to polymerization conditions similar to those employed in polymerizing the cationic carboxamide.

The following examples are given to illustrate the invention but should not be construed as limiting the scope thereof. Unless otherwise indicated, all parts and percentages of these examples are by weight.

EXAMPLE 1

To a 3-necked, round-bottom flask equipped with a thermometer, magnetic stirrer and a pH electrode are added 1 part of paraformaldehyde containing 96 percent of formaldehyde and 3.71 parts of a 40 percent aqueous solution of dimethylamine. The paraformaldehyde is added slowly to control the reaction temperature below 45° C. After a reaction time of 2 hours, the resulting formaldehyde amine adduct is then acidified to a pH of 2 by slowly adding 3.7 parts of a 38 percent aqueous solution of hydrochloric acid. During the addition of the hydrochloric acid, the reaction mixture is cooled with an ice bath to maintain the reaction mixture at a temperature below 20° C.

The resulting acidified product is then added to 4.72 parts of a 48 percent aqueous solution of acrylamide which has previously been acidified with hydrochloric acid to a pH of 2. The resulting mixture is heated to 65° C. and maintained there with stirring for a period of 2 hours. Using carbon magnetic resonance spectroscopy (CMR) analysis, the resulting composition is determined to contain 85 mole percent of N-(dimethylaminomethyl)acrylamide and less than 5 mole percent of saturated impurity.

EXAMPLE 2

For purposes of showing the preference for carrying out the process of this invention at pH below 3 when using reagents of Example 1, several runs are made according to the following procedure.

To the apparatus used in Example 1 are added 79.2 parts of a 40 percent solution of dimethylamine and then slowly 57.1 parts of 37 percent of formaldehyde in aqueous solution. The resulting reaction gives an exotherm at 25° C. within 4 minutes of the addition of the formaldehyde. The resulting reaction mixture contains 39 percent solids of primarily dimethylaminomethanol. This clear product is cooled to 10° C. and acidified with hydrochloric acid to the pH listed in Table I.

This acidified dimethylaminomethanol is then added to a 50 percent aqueous solution of acrylamide also acidified with hydrochloric acid to the pH listed in Table I. The resulting reaction mixture is subjected to a heat history sufficient to ensure conversion to the desired amount of N-(dimethylaminomethyl)acrylamide. This heat history varies from 3 to 6 hours at 40° C. The resulting product is analyzed by CMR and determined to contain the proportions of N-substituted acrylamide, acrylamide and saturated impurity as indicated in Table I.

For purposes of comparison, two runs are carried out following the general procedure described hereinbefore except that the pH of the reaction mixture is 7 and 5.0, respectively. The results of these runs are also reported in Table I.

TABLE I

| Sample No. | Reaction pH | Mole % DMAMAAM (1) | Mole % AAM (2) | Mole % Saturated Impurity |
|---|---|---|---|---|
| 1 | 2.0 | 68 | 29 | ~3 |
| 2 | 3.0 | 65 | 27 | 8 |
| C₁* | 7.0 | <3 | <3 | >94 |
| C₂* | 5.0 | 9 | 19 | 72 |

*Not an example of this invention.
(1) N-(dimethylaminomethyl)acrylamide
(2) Acrylamide As evidenced by the data of Table I, it is critical to practice the method of this invention at pH's below 7 in order to obtain any yield of the desired N-substituted acrylamide. In order to obtain suitable yields of the cationic acrylamide, it is desirable to employ a pH of less than 5, preferably 3 or less. In this regard, it should be noted that of all carboxamides, acrylamide exhibits the greatest tendency to form saturated impurity at pH in the range of 5-7. Accordingly, the reaction mixture pH of 5-7 is suitable if other carboxamides, such as methacrylamide, are employed.

EXAMPLE 3

Following the procedure of Example 2 except that the reaction pH is 2, two runs are carried out to show the effect of heat history on the N-substituted acrylamide. In one run, the reaction is carried out at 40° C. for 11 hours and the resulting product is analyzed by carbon magnetic resonance for N-substituted acrylamide, acrylamide and saturated impurity. In the second run, the reaction is also carried out at 40° C. and the reaction product is maintained at that temperature for a period of 26 hours. The product of this reaction is similarly analyzed by carbon magnetic resonance. The results of analysis for both runs are reported in Table II.

TABLE II

| Sample No. | Reaction Time, hrs | Mole % DMAMAAM (1) | Mole % AAM (2) | Mole % Saturated Impurity |
|---|---|---|---|---|
|  | 11 | 75 | 22 | 3 |
| 2 | 26 | 79 | 11 | 10 |

(1) N-(dimethylaminomethyl)acrylamide
(2) Acrylamide

As evidenced by the data shown in Table II, greater amounts of the saturated impurity are generally formed when longer reaction times are employed.

EXAMPLE 4

Following the procedure of Example 1, a dimethylaminomethanol adduct is prepared, acidified and cooled. This adduct is added to 18.2 parts of a 15 percent aqueous solution of methacrylamide which has been previously acidified to a pH of 2. The resulting mixture is heated for 2 hours at 65° C. and then analyzed by carbon magnetic resonance. Results of the analysis indicate that the final reaction product contains 75 mole percent of N-(dimethylaminomethyl)methacrylamide.

EXAMPLE 5

To the apparatus employed in Example 1, is added 81.1 parts of a formalin solution containing 37 percent of formaldehyde and 147.0 parts of a 48.2 percent aqueous solution of acrylamide, both of which have been acidified with hydrochloric acid to a pH of 2. To this homogeneous solution are added 100 parts of an aqueous amine reagent containing 97 percent of diallylamine in a remaining amount of 38 percent hydrochloric acid. This reagent also has a pH of 2. The resulting reaction mixture is heated at 65° C. for 2 hours. Analysis of the resulting reaction product by carbon magnetic resonance indicates conversion to 80 mole percent of N-(diallylaminomethyl)acrylamide.

EXAMPLE 6

To the apparatus of Example 1 are added equal molar amounts of formalin containing 37 percent formaldehyde, 22.2 percent aqueous solution of diethylamine and 47.6 percent aqueous solution of acrylamide, all acidified to a pH of 2. The resulting mixture is heated with stirring at 60° C. for 3 hours. Analysis of the resulting product by CMR spectroscopy indicates a product containing greater than 75 mole percent of N-(diethylaminomethyl)acrylamide.

EXAMPLE 7

In a reaction vessel equipped with thermometer and pH electrode are added 5 parts of a 38 percent aqueous solution (pH of 2) of the cationic acrylamide monomer of Example 1 and 2 parts of a >99 percent pure dimethylsulfate reagent. An aqueous solution of 50 percent sodium hydroxide is then added portionwise to the heterogeneous mixture to maintain the pH around 3.0. As the quaternization reaction proceeds, the temperature is maintained between 30°-35° C. The clear product, analyzed by CMR, comprises >80 mole percent of N-(trimethylammonium methyl)acrylamide salt and less than 5 mole percent saturated by-product.

EXAMPLE 8

Into a 500 ml resin pot equipped with a stirrer, thermometer and nitrogen purge tube are added 75 parts of a 30 percent aqueous solution (pH of 1) of the cationic acrylamide of Example 1 and 375 parts of deionized water. The mixture is adjusted to a pH of 3 with a 50 percent aqueous solution of sodium hydroxide and purged for one hour with nitrogen. As initiator, an aqueous solution of a conventional redox catalyst is injected simultaneously through a port into the vessel. The reaction is allowed to proceed over a 2-hour period at 30° C. The resulting viscous polymer solution is then heated to 50° C. and a second shot of the aforementioned initiator is introduced. After the polymerization recipe is heated for 2 hours at 65° C., the polymerization is terminated and the resulting polymer of the cationic acrylamide is recovered.

EXAMPLE 9

To the resin pot similar to the one used in Example 8 is added a water-in-oil emulsion containing the following ingredients:
  298 parts of a 36 percent aqueous solution (pH of 3) of the cationic acrylamide of Example 1,
  56 parts of deionized water,
  140 parts of Isopar ® M (a mixture of isoparaffinic hydrocarbons having a flash point of 170° F.), and
  11 parts of isopropanolamide of oleic acid.
The resin pot containing the foregoing emulsion is heated to 30° C. and purged with nitrogen for one hour. Polymerization of the recipe at pH of 3 is effected by adding a conventional redox catalyst to the recipe and maintaining the recipe at 30° C. for 3 hours. The recipe is then heated at 50° C. for one hour to yield a water-in-oil emulsion of poly[N-(dimethylaminomethyl)acrylamide].

EXAMPLE 10

Into a reaction vessel as employed in Example 1 is added 13.3 parts of paraformaldehyde and 62.9 parts of a 48.1% aqueous solution of acrylamide. The pH is adjusted with aqueous NaOH to 11.5 and the homogeneous mixture allowed to stand 24 hours at room temperature. The product, >90 mole percent converted N-methylolacrylamide, is acidified to a pH of 2 and to it is added 57.5 parts of a 40% dimethylamine aqueous solution acidified to a pH of 2. The resulting solution is heated 3 hours at 65° C. and yields about 50 mole percent of N-(dimethylaminomethyl)acrylamide.

| | |
|---|---|
| CMR Analysis | 35% Saturated by-product<br>45% N-(dimethylaminomethyl)acrylamide<br>20% Acrylamide |

What is claimed is:
1. A process for preparing a cationic N-(aminomethyl)-α,β-ethylenically unsaturated carboxamide which comprises contacting a reaction mixture comprising an N-alkylol and/or an N-alkoxyalkyl derivative of an α,β-ethylenically unsaturated carboxamide with an amine under conditions including a pH of less than about 7 sufficient to cause reaction of the derivative and amine to form at least 10 mole percent of cationic carboxamide based on moles of the derivative.
2. The process of claim 1 wherein the derivative is one represented by the formula:

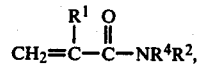

wherein $R^1$ is hydrogen or alkyl, $R^2$ is hydrogen or an inert substituent, $R^4$ is alkylol or alkoxyalkyl; the amine is a secondary amine represented by the formula:

wherein each $R^3$ is individually hydrocarbyl or inertly substituted hydrocarbyl, or two $R^3$ groups are collectively a diradical including an inertly substituted diradical which combines with N of the amine to form a heterocyclic ring and the cationic carboxamide is represented by the formula:

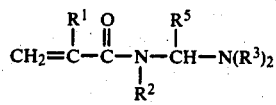

wherein $R^1$, $R^2$ and $R^3$ are as defined herein and $R^5$ is hydrogen or alkyl having one or two carbons.
3. The process of claim 2 wherein the ingredients of the reaction mixture are combined in an aqueous medium such that the pH of the reaction mixture is less than about 5.
4. The process of claim 2 wherein $R^1$ is hydrogen, methyl or ethyl, $R^2$ is hydrogen or alkyl, and $R^3$ is alkyl, alkenyl, hydroxyalkyl or aminoalkyl.
5. A process for preparing a cationic N-(aminomethyl)acrylamide which comprises contacting a reaction mixture containing acrylamide with an aldehyde selected from formaldehyde, paraformaldehyde, formalin, trioxymethane, a formal or hemiformal and an amine selected from a dialkylamine or diallylamine under conditions including pH of 3 or less sufficient to cause reaction of acrylamide, the aldehyde and amine to form at least 10 mole percent of cationic acrylamide based on moles of acrylamide.

6. The process of claim 2 wherein the reaction mixture is dissolved in an aqueous medium and dispersed in an oil phase to form a water-in-oil emulsion prior to the reaction to form the cationic carboxamide.

7. The process of claim 1, which process comprises (1) contacting a reaction mixture comprising an N-alkylol and/or an N-alkoxyalkyl derivative of an $\alpha,\beta$-ethylenically unsaturated carboxamide with an amine under conditions including a pH of less than about 7 sufficient to cause reaction of the derivative and amine to form at least 10 mole percent of cationic carboxamide based on moles of the derivative and (2) subjecting the cationic carboxamide to conditions of free radical initiated addition polymerization at pH less than about 7.

8. The process of claim 7 wherein the cationic carboxamide dissolved in the aqueous phase of a water-in-oil emulsion is subjected to polymerization conditions thereby forming a water-in-oil emulsion wherein the aqueous phase contains the polymer.

9. The process of claim 2 which comprises (1) contacting the derivative of claim 2 with the secondary amine of claim 2 under conditions including a pH of less than about 7 sufficient to form at least 10 mole percent of the cationic carboxamide of claim 2 based on moles of the derivative and (2) quaternizing the cationic carboxamide by contacting the cationic carboxamide with a quaternizing agent to form a reaction mixture having a pH below 7.

10. The process of claim 9 wherein the cationic carboxamide is a N-(dialkylaminomethyl)acrylamide and the quaternizing agent is an alkyl halide or dialkyl sulfate wherein alkyl is 1 or 2 carbons and alkylene is 2 to 3 carbons and the pH of the reaction mixture is from about 3 to about 5.

11. The process of claim 4 wherein the carboxamide reactant is acrylamide, the amine is dialkylamine or diallylamine and the pH of the reaction mixture is 3 or less.

* * * * *